United States Patent
Fleck

(10) Patent No.: US 9,771,171 B1
(45) Date of Patent: Sep. 26, 2017

(54) AIRCRAFT WING DEFORMATION MONITORING AND ANALYSIS SYSTEM

(71) Applicant: Rosemount Aerospace Inc., Burnsville, MN (US)

(72) Inventor: Travis W. Fleck, Framington, MN (US)

(73) Assignee: ROSEMOUNT AEROSPACE INC., Burnsville, MN (US)

(*) Notice: Subject to any disclaimer, the term of this patent is extended or adjusted under 35 U.S.C. 154(b) by 0 days.

(21) Appl. No.: 15/064,959

(22) Filed: Mar. 9, 2016

(51) Int. Cl.
*B64F 5/00* (2017.01)
*B64D 47/08* (2006.01)
*B64D 45/00* (2006.01)

(52) U.S. Cl.
CPC ............ *B64F 5/0045* (2013.01); *B64D 45/00* (2013.01); *B64D 47/08* (2013.01); *B64D 2045/0085* (2013.01)

(58) Field of Classification Search
CPC ........ B64F 5/0045; B64D 45/00; B64D 47/08; B64D 2045/0085
See application file for complete search history.

(56) References Cited

U.S. PATENT DOCUMENTS

| 6,961,445 | B1 | 11/2005 | Jensen et al. |
| 7,059,822 | B2 | 6/2006 | LeMieux et al. |
| 8,706,428 | B1* | 4/2014 | Righi ..................... G01B 11/16 702/34 |
| 8,779,943 | B2 | 7/2014 | Wolcken et al. |
| 2008/0097728 | A1* | 4/2008 | Delaplace ................. B64F 5/60 703/1 |
| 2009/0309762 | A1* | 12/2009 | Wolcken ................ B64D 45/00 340/945 |
| 2012/0002038 | A1 | 1/2012 | Furrer et al. |
| 2013/0197739 | A1* | 8/2013 | Gallagher ................. B64F 5/60 701/31.5 |
| 2014/0092206 | A1 | 4/2014 | Boucourt et al. |
| 2014/0241572 | A1 | 8/2014 | Tillotson |

FOREIGN PATENT DOCUMENTS

| GB | 2398771 A | 9/2004 |
| WO | 0103437 A1 | 1/2001 |

OTHER PUBLICATIONS

Berger et al., "Optical Vibration Measurement and Frequency Response Analysis on Large Structures under Multiple Excitation Load Conditions", Proceedings of ISMA, 2010, pp. 1693-1702.
Davis, "Measurement of Flexible Wing Deformations in Flight", Thesis, University of Florida, 2006, pp. 1-72.

(Continued)

*Primary Examiner* — Aaron L Troost
(74) *Attorney, Agent, or Firm* — Cantor Colburn LLP

(57) ABSTRACT

A wing deformation monitoring and analysis system includes at least one image sensor installed on a portion of the aircraft such that at least one wing of the aircraft is located in a field of view (FOV) of the at least one image sensor. The image sensor outputs at least one image signal representing a captured wing image of the at least one wing. An electronic deformation controller is configured to compare the captured wing image to a nominal wing image, determines a deformation of the at least one wing based on the comparison.

20 Claims, 6 Drawing Sheets

(56) References Cited

OTHER PUBLICATIONS

Kannemans, "Flight Testing of a Wing Deflection Measurement Method", American Institute of Aeronautics and Astronautics, 1995, p. 95 (Abstract).

Kirmse et al., "Development of a Multi Camera System for Flap Gap Observation in Flight Testing", 17th SFTE (EC) Symposium, Jun. 12-14, 2006, Amsterdam, The Netherlands, pp. 1-11.

Lizotte et al., "Deflection-Based Aircraft Structural Loads Estimation With Comparison to Flight", American Institute of Aeronautics and Astronautics, 2005, 1-18 pages.

Yates, "Inspection of aircraft after abnormal flight loads, heavy landing or lightning strike", Civil Aviation Advisory Publication, May 2000, 8 pages.

* cited by examiner

AIRCRAFT WING DEFORMATION MONITORING AND ANALYSIS SYSTEM

TECHNICAL FIELD

The present invention relates generally to a vehicle component monitoring system, and more particularly, to a vehicle component monitoring and analysis system installed on a winged aircraft.

BACKGROUND

Aircraft vehicles experience flight and landing loads during operation. With regard to winged aircrafts, the flight and/or landing loads typically cause the wings to deform such as, for example, defect upwards and/or downwards from their nominal position. As the deformation increases with respect to the nominal position, the level of stress realized by the wings increases.

SUMMARY

According to a non-limiting embodiment, a deformation monitoring and analysis system includes at least one image sensor installed on a portion of the aircraft such that at least one wing of the aircraft is located in a field of view (FOV) of the at least one image sensor. The image sensor outputs at least one image signal representing a captured wing image of the at least one wing. An electronic deformation controller is configured to compare the captured wing image to a nominal wing image, determines a deformation of the at least one wing based on the comparison.

According to another non-limiting embodiment, a method of detecting a deformation of at least one wing included on an aircraft comprises capturing a wing image of the at least one wing via at least one image sensor, and outputting at least one image signal representing the captured wing. The method further includes comparing the captured wing image to a nominal wing image, and determining a deformation of the at least one wing based on the comparison.

Additional features are realized through the techniques of the present disclosure. Other non-limiting embodiments are described in detail herein and are considered a part of the claimed invention. For a better understanding of the various non-limiting embodiments, the following description is provided.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various non-limiting embodiments provide an aircraft including a wing deformation monitoring and analysis system configured to monitor the aircraft wings, detect a deformation of the wings, and alert of an excessive wing deformation based on a threshold deformation value. In at least one embodiment, one or more image sensors such as, for example, a camera may be installed on the rear vertical and/or horizontal stabilizers of the aircraft. The image sensor(s) has a field of view that captures a respective wing or at least a portion of the wing. The state of each wing can then be captured by one or more image sensors and compared to a nominal wing image stored in a memory unit. When the captured wing image does not match the nominal wing image, the deformation monitoring and analysis system may determine that the wing deformed, e.g., deflected and/or torqued.

In at least one embodiment, an amount of deformation with respect to the nominal wing state may be calculated to determine deformation differential value ($\Delta_D$). The $\Delta_D$ can be compared to a deformation threshold value ($TH_D$) so as to determine whether an excessive deformation of a respective wing occurred due an excessive load event such as, for example, heavy turbulence and/or a hard landing. In response to detecting an excessive deformation, the wing deformation monitoring and analysis system may output one or more alerts thereby immediately indicating a specific time and/or duration at which a particular wing realized an excessive deformation.

Figure 1:
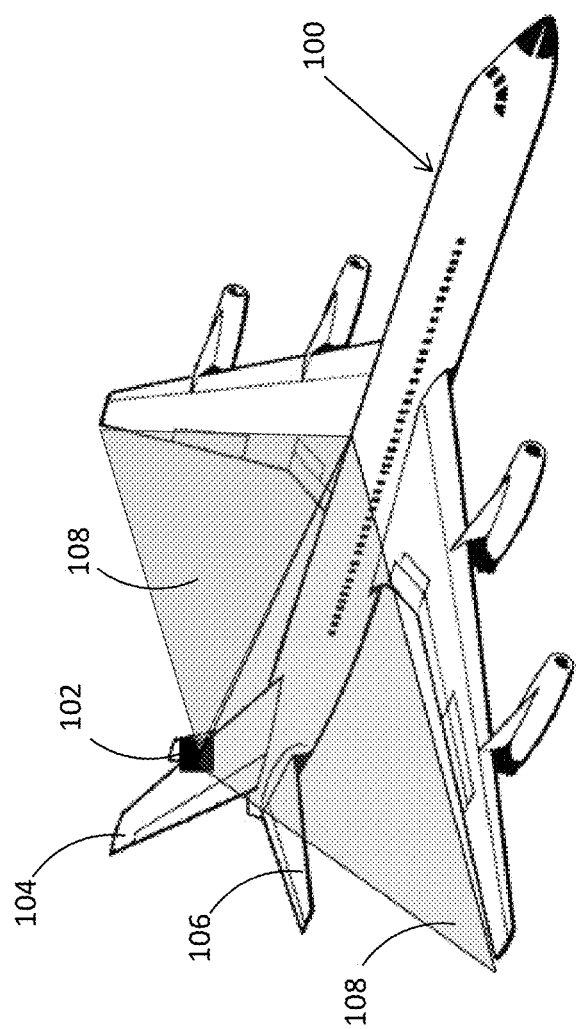
FIG. 1 is a perspective view of an aircraft including a wing deformation monitoring and analysis system according to a non-limiting embodiment.
Figure 2:
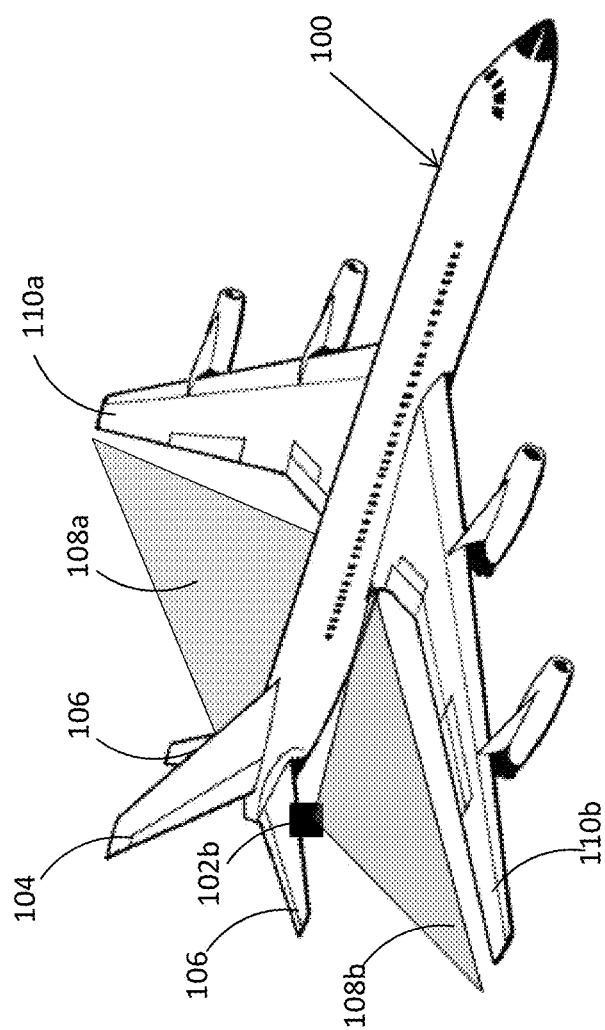
FIG. 2 is a perspective view of an aircraft including a wing deformation monitoring and analysis system according to another non-limiting embodiment.

Turning now to FIGS. 1-2, an aircraft 100 including a wing deformation monitoring and analysis system is illustrated according to a non-limiting embodiment. The wing deformation monitoring and analysis system includes one or more image sensors 102a-102b installed on the vertical stabilizer 104 and/or horizontal stabilizers 106 of the aircraft 100. The image sensors 102a-102b may be constructed as cameras 102a-102b, for example, having a field of view (FOV) 108a-108b capable of capturing the aircraft wings 110a-110b or a portion of the wings 110a-110b. In at least one embodiment, the first and second image sensors 102a-102b are installed on opposing surfaces of the aircraft's vertical stabilizer 104. In this case, the FOV 108a-108b declines from above the wings 110a-110b as illustrated in FIG. 1. Accordingly, the images sensors 102a-102b may have an improved view of the upper surface of the wings 110a-110b. In another embodiment illustrated in FIG. 2, the first and second image sensors 102a-102b are installed on opposing horizontal stabilizers 106. This arrangement places each image sensor 102a-102b on the same plane, or substantially the same plane, as a respective wing 110a-110b. That is, the rear portion of the wings 110a-110b is in-line or substantially in-line with the FOV 108a-108b of a respective image sensor 102a-102b. In this manner, the image sensors 102a-102b may more accurately capture a deflection and/or torque of a respective wing 110a-110b.

Figure 3A:
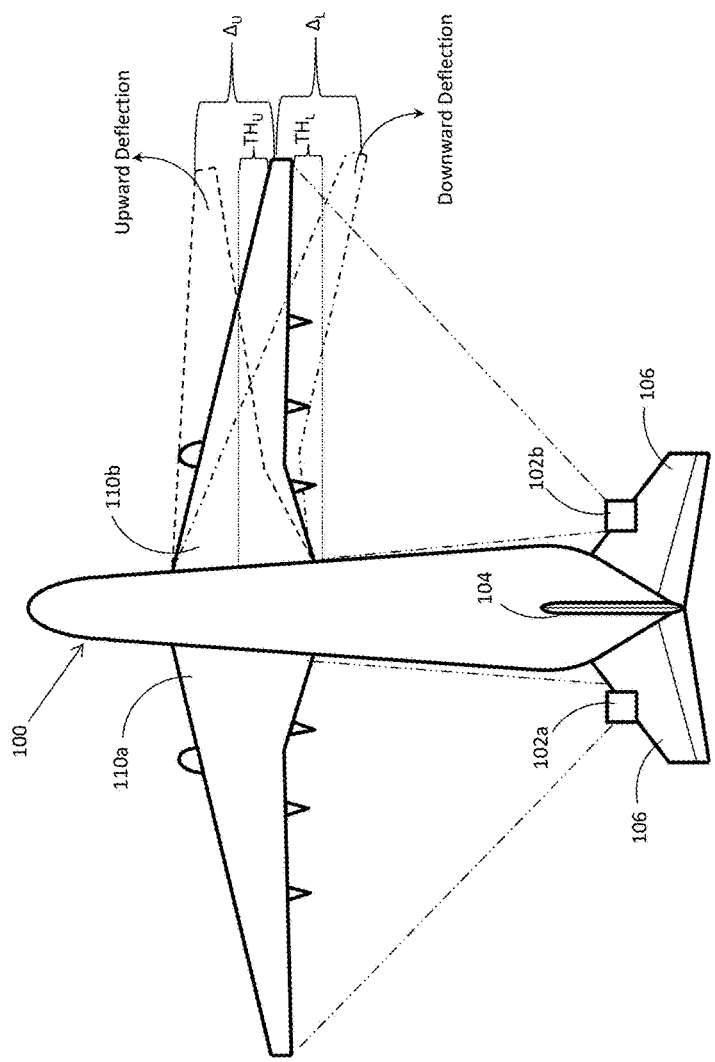
FIGS. 3A-3B is a diagram of an aircraft wing deformation monitoring and analysis system configured to detect a deflected aircraft wing according to a non-limiting embodiment.
Figure 3B:
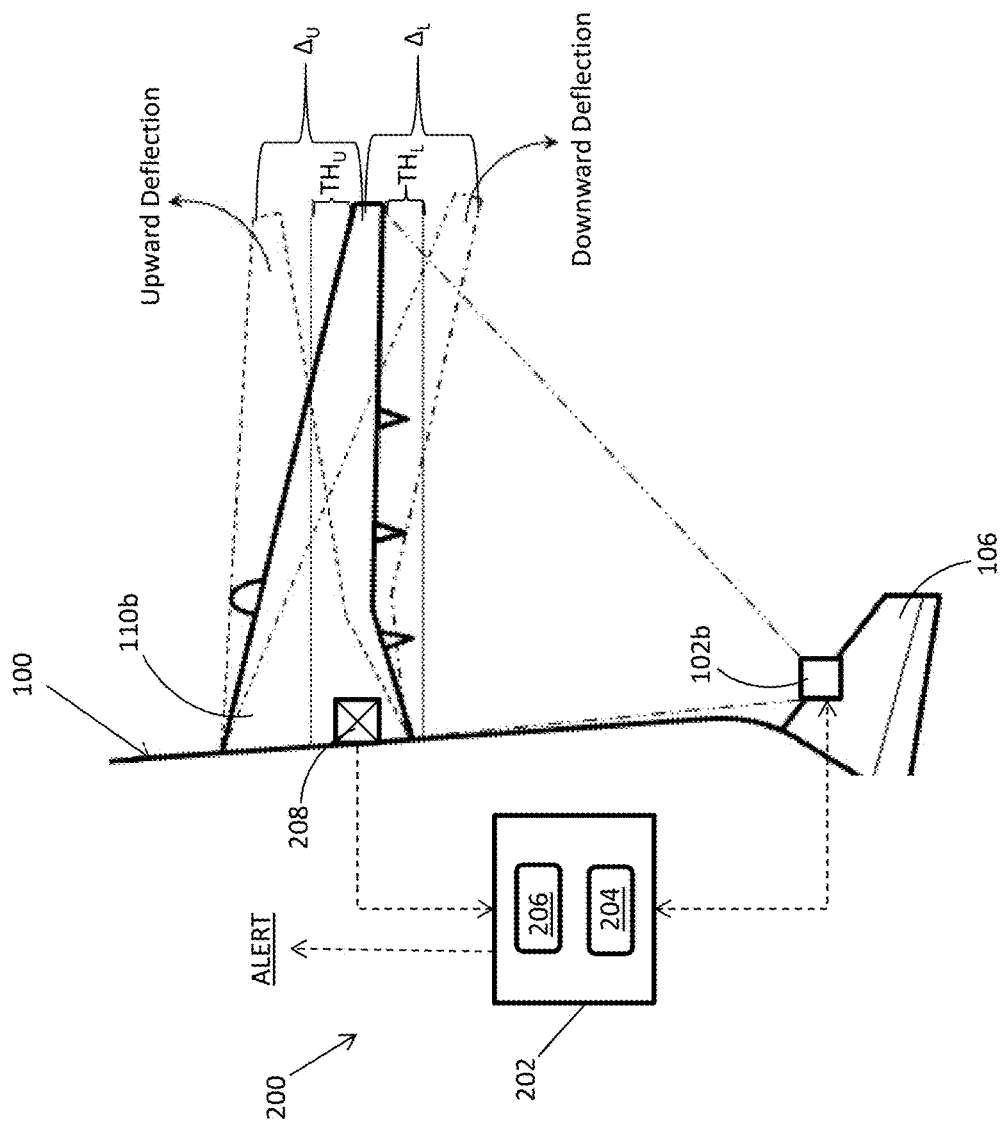

Referring now to FIGS. 3A-3B, an aircraft wing deformation monitoring and analysis system 200 configured to detect a deformation of one or more wings 110a-110 is illustrated according to a non-limiting embodiment. The deformation includes, for example, detection of a deflected wing, e.g., wing 110b as illustrated in FIG. 3A. The wing deformation monitoring and analysis system 200 may also detect a torqued wing, e.g., wing 100b as discussed in greater detail below.

Still referring to FIGS. 3A-3B, an aircraft 100 includes a wing deformation monitoring and analysis system 200. The wing deformation monitoring and analysis system 200 includes at least one image sensor 102a-102b, and electronic deformation controller 202 (see FIG. 3B). The at least one image sensor 102a-102b is installed on a portion of the aircraft 100 and is in electrical communication with the deformation controller 202. As described above, one or more image sensors 102a-102b may be installed on the vertical stabilizer 104 and/or on the horizontal stabilizers 106. In this manner, at least one wing 110a-110b is located in a field of view (FOV) 108a-108b of the at least one image sensor 102a-102b. The at least one sensor 102a-102b may include a camera, for example, and is configured to output at least one image signal representing a captured wing image of the at least one wing 110a-110b.

The electronic deformation controller 202 includes a memory unit 204 and a hardware processor 206 such as, for example, a microprocessor, or a Field Programmable Gate Array (FPGA). The memory unit 204 stores data and instructions readable by the processor 206. The data includes, but is not limited to, image recognition algorithms, threshold data, nominal wing images and models, deformation models, and other instructions executable by the hardware processor 206. Accordingly, the deformation controller 202 is configured to compare the captured wing image provided by one or more image sensors 102a-102b to a nominal wing image stored in the memory unit 204, and can determine a deformation of the at least one wing (e.g., a vertical deflection and/or a torque) based on the comparison. Although the deformation controller 202 is illustrated separately from the image sensors 102a-102b, each image sensor 102a-102b may include an individual deformation controller 202.

According to at least one embodiment, if the deformation controller 202 detects a vertical deflection one or more of the wings 110a-11b, the deformation controller 202 can calculate a deflection differential value. The deflection differential value is based on a vertical distance at which a respective wing 110a-110b deflects either upward ($\Delta_U$) or downward ($\Delta_L$) with respect to the nominal position of the wing 110a-110b (e.g., the position of the wing at steady-state). This vertical distance may be determined using various well-known image processing technique, modeling techniques, and algorithms that are applied when comparing the captured wing image to the nominal wing image.

According to at least one embodiment, the deformation controller determines an excessive deformation (e.g., an excessive vertical deflection) of a respective wing 110a-110b when ($\Delta_D$) exceeds a deflection threshold value. The deflection threshold value may include a single threshold value that applies to both the upper and lower deflections. The deflection value may also include individual threshold values, e.g., an upper threshold value ($TH_U$) and a lower threshold value ($TH_L$). The deformation controller 202 may also determine the existence of an excessive stress incident based on the number of detected excessive deformations. For example, the deformation controller may count the number of instances an excessive deformation occurs, and compare the counted number to a threshold value. When the number of excessive deflection exceeds the stress incident threshold value, the deformation controller determines that a respective wing has undergone or is currently undergoing an excessive stress incident. The deformation controller 202 may apply additional conditions to the comparison before concluding an excessive stress incident exists. For example, the deformation controller 202 may monitor a time period during which the excessive deflections were detected, and may determine an excessive stress incident exists when the number of excessive deflections occurs within a time period threshold.

In at least one embodiment, the deformation controller 202 outputs at least one alert signal in response to determining at least one of the excessive deformation and the excessive stress incident. The alert signal may be delivered to a local alert system of the aircraft 100, and/or to a remote alert system located remotely from the aircraft, e.g., on the ground. The signal may initiate one or more alerts indicating the excessive deformation (e.g., excessive deflection and/or excessive torque) and/or the excessive stress incident. The alert may include, but is not limited to, a visual alert, a sound alert, a physical alert, and/or a maintenance message to the aircraft maintenance team. The alert signal and/or captured images may be exchanged with systems installed on the aircraft and/or systems remotely located from the aircraft (e.g., ground monitoring systems) using various means including, but not limited to, Wi-Fi, WiMax, cellular communication, wired Ethernet, and/or a removable memory storage unit.

In at least one embodiment, the wing deformation monitoring and analysis system 200 may record event after an alert signal has been output. For example, images (e.g., video) provided by the image sensors 102a-102b may be continuously buffered in RAM and upon an alert is saved to a hard drive. The recording time may be initiated at time (T1) when the alert signal is output, and may continue over a time period until the recording is discontinued at time (T2). The time period may be pre-selected, or may be determined based on a threshold during which no additional the excessive deformations and/or the excessive stress incidents occur during a recording threshold time period. Accordingly, further data may be provided to a maintenance team when performing inspection and maintenance of the aircraft.

The 200 may further include one or more load event sensors 208 installed at various locations of the aircraft 100. The load event sensor 208 is configured to output a load event signal in response to detecting a load event. The load event includes, but is not limited to, turbulence and surface impact. In response to receiving the load event signal, the deformation controller invokes operation of one or more of the image sensors 102a-12b and requests one more captured wing images of one or more of the wings 110a-110b.

The deformation controller is also configured to recognize one or more stress related imperfections. The stress-related imperfection includes, but is not limited to, a crack in the at least one wing. In at least one embodiment, the deformation controller detects a crack in response to comparing the nominal image excluding any cracks to the capture image having the at least one crack. When the image sensor 102a-102b is constructed as a camera, the deformation controller 200 may command the camera 102a-102b to zoom in on a portion of the wing 110a-110b in response to receiving the load event signal. In this manner, the deformation controller 200 may obtain a clearer image of the possible stress areas to determine if one or more cracks formed in the wings 110a-110b following the load event, e.g., high and/or sustained turbulence or a hard landing.

Figure 4:
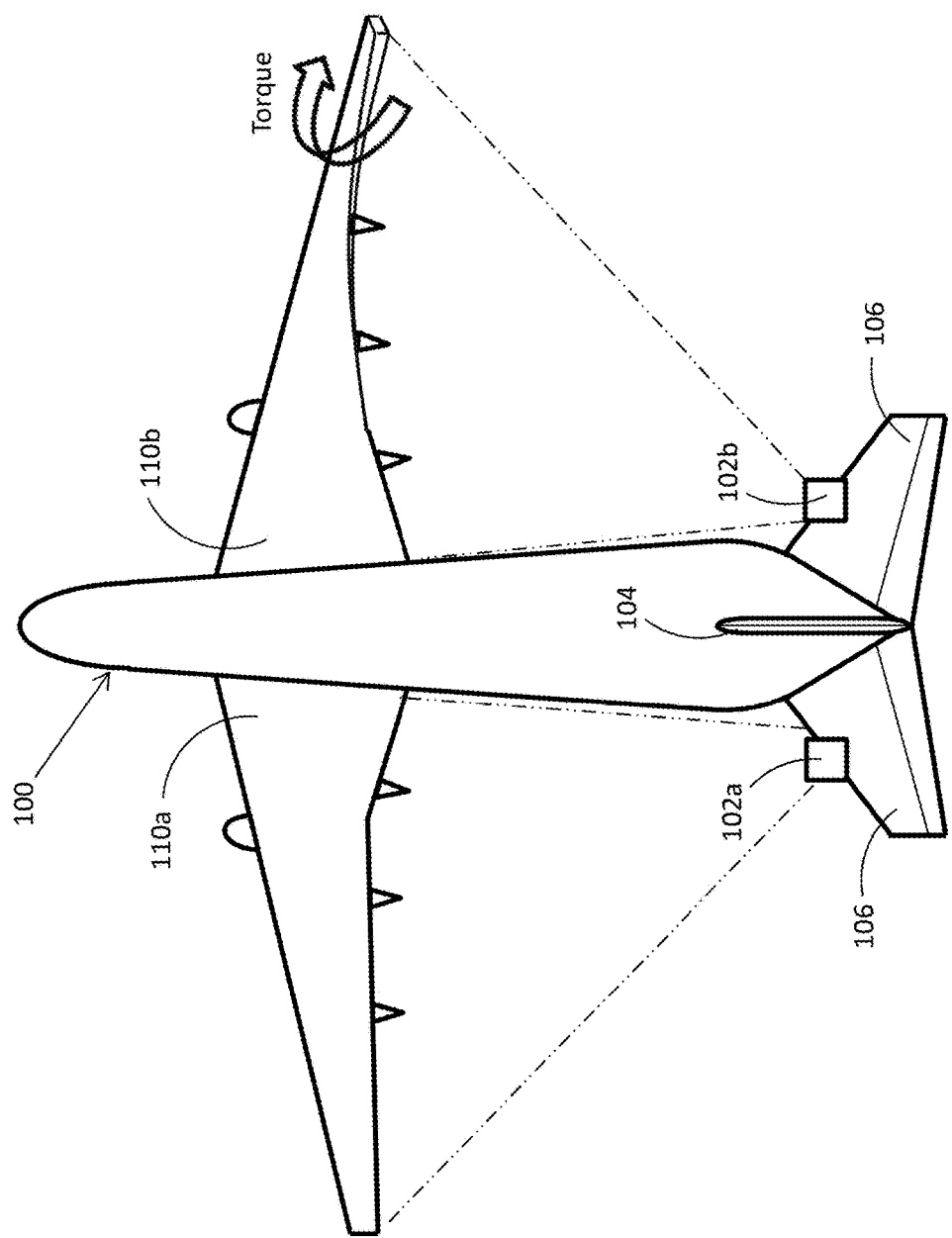
FIG. 4 is a diagram of an aircraft wing deformation monitoring and analysis system configured to detect a torqued aircraft wing according to a non-limiting embodiment.

Turning now to FIG. 4, an aircraft wing deformation monitoring and analysis system 200 configured to detect deformation of one or more wings 110a-110 is illustrated according to another non-limiting embodiment. The system of FIG. 4 operates similar to the deflection detection system described above. The system of claim 4, however, illustrates a feature of detecting whether one or more of the wings 102a-102e experienced a torqueing event (i.e., a force that twists the wing about a center axis). Similar methods and techniques described may be employed to determine whether one or more of the wings 102a-102e experiences a torque force, but also whether a respective wing 102a-102b is excessively torqued. For example, an image sensors 102a-102b may generate a captured image of one or more of the wings 102a-102e. The deformation module 202 may then compare the captured wing image to a nominal wing image to determine not only whether one or more wings 102a-102e was torqued, but whether a wing 102a-102e experienced an excessive torque that may have cause formation of a crack.

Figure 5:
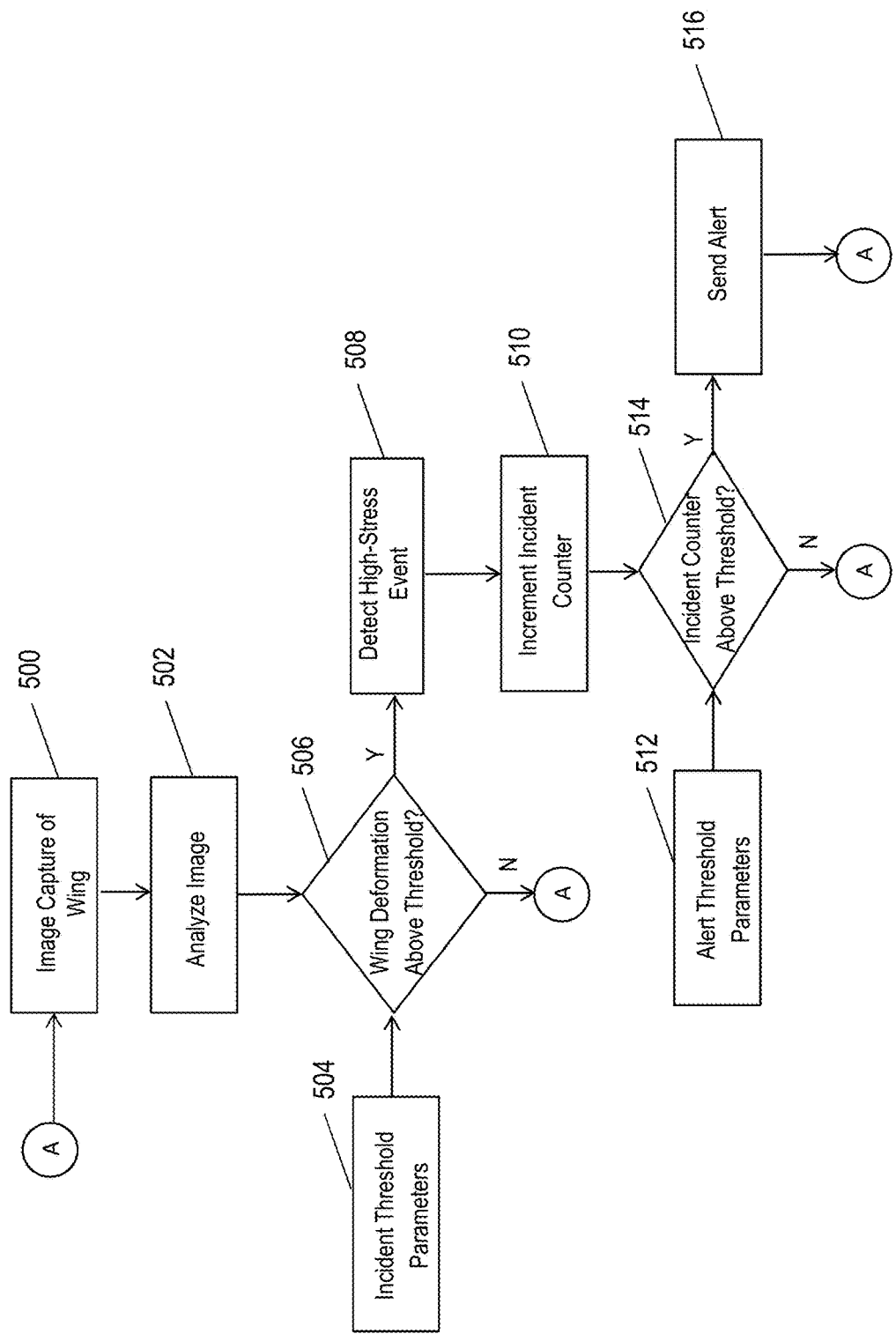
FIG. 5 is a flow diagram illustrating a method of controlling an aircraft wing deformation monitoring and analysis system according to a non-limiting embodiment.

With reference now to FIG. 5, a flow diagram illustrates a method of controlling an aircraft wing deformation monitoring and analysis system according to a non-limiting embodiment. At operation 500, a captured wing image of one or more of the aircraft's wings is generated. In at least one embodiment, the captured wing image is generated by one or more cameras mounted on the vertical stabilizer and/or horizontal stabilizers of the aircraft. At operation 502, the captured wing image is analyzed to whether the captured wing image shows the wing deformed due to a load event such as, for example, turbulence or a surface contact from a landing. Various image analyzation and modeling techniques may be applied to the captured wing image to detect deformation of the wing. The deformation may include, but is not limited to, vertical wing deflection and/or torque (i.e., wing twisting).

At operation 504, one or more incident threshold parameters are obtained and a comparison is performed at operation 506 to determine whether the wing deformation exceeds a threshold value. When the wing deformation is below or equal to the threshold value, the method returns to operation 500 and continues capturing the wing image. When, however, the wing deformation exceeds the threshold value, a high-stress or excessive stress incident is determined at operation 508 and an incident counter is incremented at operation 510.

Turing to operation 512, one or more alert threshold parameters are obtained and a comparison is performed at operation 514 to determine whether the number of counted high-stress or excessive stress incidents exceeds an alert threshold value. When the number of counted stress events is below or equal to the alert threshold value, the method returns to operation 500 and continues generating captured wing images. When, however, the number of counted stress events exceeds the threshold value, an alert is output at operation 516 indicating the aircraft has been exposed to at least one high-stress or excessive stress incident. The alert may include, but is not limited to, a visual alert, a sound alert, and a physical alert. After outputting the alert, the method may return to operation 500 and to continue generating captured wing images.

As described in detail above, various non-limiting embodiments provide an aircraft including a wing deformation monitoring and analysis system configured to monitor the aircraft wings, detect a deformation of the wings, and alert of an excessive wing deformation based on a threshold deformation value. In at least one embodiment, one or more image sensors such as a camera, for example, may be installed on the rear vertical and/or horizontal stabilizers of the aircraft. The image sensor(s) have a field of view that captures a respective wing or at least a portion of the wing. The state of each wing can then be captured by one or more image sensors and compared to a nominal wing image stored in a memory unit. When the captured wing image does not match the nominal wing image, the deformation monitoring and analysis system may determine that the wing deformed, e.g., deflected and/or torqued. An alert may be output indicating one or more of the aircraft wings experienced a high-stress event. In this manner, the wings may be further analyzed once the aircraft is landed thereby improving aircraft maintenance and servicing procedures.

As used herein, the term "module" refers to an application specific integrated circuit (ASIC), an electronic circuit, an electronic computer processor (shared, dedicated, or group) and memory that executes one or more software or firmware programs, a combinational logic circuit, a Field Programmable Gate Array (FPGA), and/or other suitable components that provide the described functionality. When implemented in software, a module can be embodied in memory as a non-transitory machine-readable storage medium readable by a processing circuit and storing instructions for execution by the processing circuit for performing a method.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A wing deformation monitoring and analysis system, comprising:

at least one image sensor installed on an aircraft and at a separate location from at least one wing of the aircraft, the at least one image sensor configured to output at least one image signal representing a captured wing image of the at least one wing of the aircraft, the at least one image sensor arranged on a same plane of the at least one wing such that the at least one image and the at least one wing are co-planar with one another;

an electronic deformation controller in electrical communication with the at least one image sensor, the electronic deformation controller configured to compare the captured wing image to a nominal wing image arranged on a reference plane, to determine a deformation differential based on an amount of deflection the at least one wing deflects upwards or downwards with respect to the reference plane, and to determine a deformation of the at least one wing based on the comparison, wherein an upper deflection threshold is located an upward distance from the reference plane defined by the nominal wing image and a lower deflection threshold is located a downward distance from the reference plane defined by the nominal wing image, and wherein the electronic deformation controller determines a deformation of the at least one wing in response to a captured wing deflection included in the captured wing image exceeding at least one of the upper deflection threshold and the lower deflection threshold.

2. The system of claim 1, wherein the at least one image sensor is installed on at least one of a vertical stabilizer of the aircraft and a horizontal stabilizer of the aircraft such that the at least one wing of the aircraft is located in a field of view (FOV) of the at least one image sensor.

3. The system of claim 1, wherein the comparison indicates the deformation is at least one of a vertical deflection of the at least one wing and a torque of the at least one wing.

4. The system of claim 3, wherein the deformation controller is configured to determine a deflection differential value based on a vertical distance at which the captured wing image is deflected with respect to the nominal wing image.

5. The system of claim 4, wherein the deformation controller determines an excessive deformation of the at least one wing when the deflection differential value exceeds a deflection threshold value.

6. The system of claim 5, wherein the deformation controller determines an excessive stress incident when a number of detected excessive deformations exceeds a stress incident threshold value.

7. The system of claim 6, wherein the deformation controller outputs at least one alert in response to determining at least one of the excessive deformation and the excessive stress incident.

8. The system of claim 1, wherein the deformation controller continuously stores the captured images in memory in response to outputting the at least one alert.

9. The system of claim 1, further comprising a load event sensor configured to output a load event signal in response to detecting a load event, the load event including at least one of turbulence and surface impact.

10. The system of claim 9, wherein the deformation controller commands the at least one image sensor to output the captured wing image in response to receiving the load event signal.

11. A method of detecting a deformation of at least one wing included on an aircraft, the method comprising:
installing at least one image sensor on the aircraft and at a separate location from the at least one wing;
aligning at least one image sensor on a same plane of the at least one wing such that the at least one image and the at least one wing are co-planar with one another;
capturing a wing image of the at least one wing via at least one image sensor;
outputting at least one image signal representing the captured wing; and
comparing the captured wing image to a nominal wing image that is arranged on a reference plane;
defining at least one of an upper threshold located an upward distance from the reference plane defined by the nominal wing image and a lower threshold located an downward distance from the reference plane defined by the nominal wing image; and
determining a deformation of the at least one wing in response to a captured wing deflection included in the captured wing image exceeding at least one of the upper deflection threshold and the lower deflection threshold.

12. The method of claim 11, wherein the at least one image sensor is installed on at least one of a vertical stabilizer of a winged aircraft and a horizontal stabilizer of the winged aircraft.

13. The method of claim 11, wherein the comparison indicates the deformation is at least one of a vertical deflection of the at least one wing and a torque of the at least one wing.

14. The method of claim 13, wherein the deformation controller is configured to determine a deflection differential value based on a vertical distance at which the captured wing image is deflected with respect to the nominal wing image.

15. The method of claim 14, wherein the deformation controller determines an excessive deformation of the at least one wing when the deflection differential exceeds a deflection threshold value.

16. The method of claim 15, wherein the deformation controller determines an excessive stress incident when a number of detected excessive deformations exceeds a stress incident threshold value.

17. The method of claim 16, wherein the deformation controller outputs at least one alert in response to determining at least one of the excessive deformation and the excessive stress incident.

18. The method of claim 17, wherein the deformation controller continuously stores the captured images in memory in response to outputting the at least one alert.

19. The method of claim 11, further comprising a load event sensor configured to output a load event signal in response to detecting a load event, the load event including at least one of turbulence and surface impact.

20. The method of claim 19, wherein the deformation controller commands the at least one image sensor to output the captured wing image in response to receiving the load event signal.

* * * * *